Figure 1:
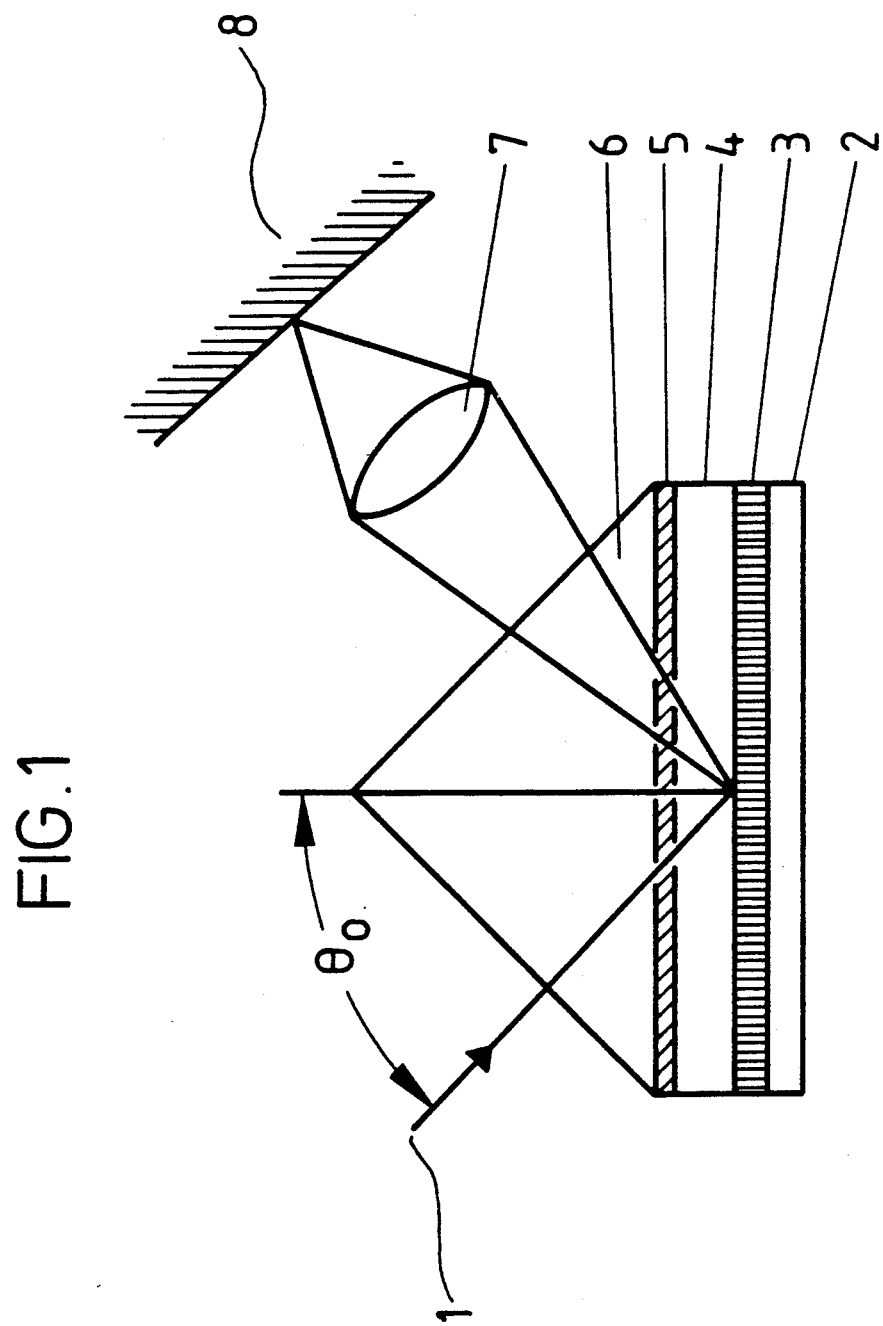

United States Patent [19]
Funhoff et al.

[11] Patent Number: 5,049,462
[45] Date of Patent: Sep. 17, 1991

[54] READING OUT INFORMATION STORED IN THIN POLYMER LAYERS

[75] Inventors: Dirk Funhoff, Heidelberg; Harald Fuchs, Carlsberg; Ulrike Licht, Mannheim; Wolfgang Schrepp, Heidelberg; Werner Hickel, Mannheim; Wolfgang Knoll, Mainz; Gerhard Wegner, Mainz-Drais; Gisela Duda, Dietzenbach, all of Fed. Rep. of Germany

[73] Assignee: BASF Aktiengesellschaft, Ludwigshafen, Fed. Rep. of Germany

[21] Appl. No.: 481,299

[22] Filed: Feb. 20, 1990

[30] Foreign Application Priority Data

Mar. 2, 1989 [DE] Fed. Rep. of Germany ....... 3906521

[51] Int. Cl.$^5$ .................. G11C 7/00; G11B 7/00; B32B 9/04; G03C 11/00
[52] U.S. Cl. ................................. 430/21; 430/945; 430/269; 430/290; 428/411.1; 369/100; 369/101; 369/110; 365/215; 365/217
[58] Field of Search ............... 430/21, 940, 945, 269, 430/290; 428/411.1; 250/96.14; 369/100, 101, 110; 365/215, 217

[56] References Cited

U.S. PATENT DOCUMENTS

4,314,021 2/1982 O'Brien et al. .................... 430/270
4,804,747 2/1989 Allen et al. ........................ 430/940

FOREIGN PATENT DOCUMENTS

0022618 4/1985 European Pat. Off.
0077577 4/1985 European Pat. Off.
0021695 12/1986 European Pat. Off.

OTHER PUBLICATIONS

Thermotropic Liquid-Crystalline . . . Shibaev et al., Polymer Comm., 1983, vol. 24, Dec., pp. 364–365.
Physics of Thin Films, Raether, Academic Press, vol. 9, 1977, pp. 145-261.
Surface-Plasmon Microscopy, Rothenhäusler et al., Nature, vol. 332, Apr. 14, 1988.
Physical Methods of Chemistry, Techniques of Chemistry, vol. 1, pp. 577-703.
Polymerization of Diacetylenes in Jultilayers, Lieser et al., Journal of Polymer Science, vol. 17, 1631-1644 (1979).
Preparation and Characterization of Monolayers . . . , Duda et al., Thin Solid Films, 159 (1988) 221-230.
Decay of Non Radiative Surface Plasmons . . . , Kretschmann, Optics Communications, vol. 6, No. 2, Oct. 1972.
A Helical Copolyglutamate as Solvent . . . Makromol. Chem., Rapid Commun., 9, 495-501 (1988).
On the Decay of Plasmon Surface Polaritons at . . . Surface Science 137 (1984), 373-383, Rothenäusler et al.
Interferometic Determination of the Complex Wave . . . , Rothenhäusler, vol. 5, No. 7, Jul. 1988, J. Opt. Soc. Am. B., 1401, 1405.

Primary Examiner—Charles L. Bowers, Jr.
Assistant Examiner—Ashley I. Pezzner
Attorney, Agent, or Firm—Keil & Weinkauf

[57] ABSTRACT

Information stored in a thin polymer layer is read out in a process wherein information introduced into a thin polymer layer on a metallic or semiconductor layer by electromagnetic or particle rays which produce a permanent change in the properties of the polymer layer in the irradiated areas is read out using surface plasmons.

12 Claims, 2 Drawing Sheets

READING OUT INFORMATION STORED IN THIN POLYMER LAYERS

The present invention relates to a novel process for reading out information stored in polymer layers <0.1 μm in thickness.

Optical information storage in liquid-crystalline (LC) polymers having photoaddressable (mesogenic side) groups was considered in Abstracts of the International Liquid Crystal Conference, Freiburg, West Germany, Aug. 15-19, 1988.

A fundamental method of writing comprises local optical heating of a preoriented polymer into the isotropic phase with subsequent rapid cooling of the matrix, freezing the disordered spot, the bit (cf. V. P. Shibaev, S. G. Kostromin, N. A. Platé, S. A. Ivanov, V. Yn. Vetrov and I. A. Yakovlev, Polymer Commun. 24 (1983), 364). A further mechanism was recently proposed by M. Eich, J. H. Wendorff, B. Beck and H. Ringsdorf (cf. Macromol. Chem. Rapid Commun. 8 (1987), 59). This mechanism comprises the optical induction of a birefringent pattern through a local disruption of the liquid-crystalline order which modulates the refractive index of the storage medium.

Both techniques gain sensitivity (and consequently permit low-power laser writing) on optically marking with suitable dyes either bonded covalently to the polymer matrix or simply added to form a homogeneous mixture Whereas the first concept may have advantages for the (long-term) stability and homogeneity of the storage medium, the second concept is the simpler technique, in particular as long as no optimized host-guest system is available.

A further decisive requirement for a future storage medium is that it should be possible to read out the written information with low power. There is therefore a need for highly sensitive read-out techniques, especially if ultrathin storage media are considered.

The present invention provides a process for reading out information stored in a thin polymer layer, wherein information introduced into a polymer layer <0.1 μm in thickness on a metallic or semiconductor layer by imagewise exposure or a lithographic technique involving electromagnetic or particle rays which produce a permanent change in the properties of the polymer layer in the irradiated areas is read out using surface plasmons.

The polymer layer <0.1 μm in thickness can be applied to the metallic or semiconductor layer by spin coating, vapor deposition or adsorption from the liquid phase, but preferably by the Langmuir-Blodgett technique. In a preferred embodiment of the process according to the present invention, the polymer layer contains at least one dye in a defined concentration per unit area, preferably an oleophilic dye which is soluble in organic solvents and disperses homogeneously in the polymer matrix.

The polymer for the polymer layer can be an organic addition or condensation polymer, possible organic addition polymers being homopolymers and copolymers of alkyl acrylates or methacrylates and organic condensation polymers being preferably polyglutamates substituted in the γ-position by long-chain substituents or copolyglutamates having different alkyl substituents in the γ-position. A particularly preferred organic condensation polymer is poly(γ-methyl L-glutamate-co-γ-n-octadecyl L-glutamate).

For the purposes of the process according to the present invention, imagewise exposure can be effected by means of electromagnetic or particle rays using a mask placed on top of the polymer layer or lithographically by direct irradiation with a focused electron or laser beam.

The process of imagewise exposure or lithography using electromagnetic or particle rays creates in the irradiated areas of the polymer layer a permanent change in the properties of said layer in the form of a structural phase change of the polymer and/or in the form of a bleaching or converting of the dye or dyes present in said layer.

In the process according to the present invention, the reading out of information using surface plasmons can be effected with a laser beam, in which case the preferred laser is a helium-neon laser or an argon ion laser.

It is thus surprisingly possible, according to the present invention, for information stored in a polymer layer <0.1 μm in thickness on a metallic or semiconductor layer to be read out advantageously using surface plasmons.

Surface plasmons, also known as plasmon surface polaritons (PSPs), are discussed by H. Reather in Physics of Thin Films, edited by G. Hass, M. H. Francombe and R. W. Hoffmann (Academic Press, N.Y., 1977), vol. 9 p. 145-261.

Plasmons are the quanta of a plasma wave, i.e. a collective excitation of the conducting electron gas in a metal or semiconductor. Plasmons can be excited when electrons pass through a thin metal film or when electrons or photons are reflected by a thin metal film and the electrons lose energy and the photons become absorbed and converted into a plasmon. Plasmons are associated with strong electromagnetic fields. Owing to the resonance-like character, there is an approximately 20-fold increase in the field strength. These strong electromagnetic fields of plasmons are pushed by the applied layer or layers back into the metal or semiconductor layer. The dispersion curve, i.e. the dependence of the frequency on the wave vector for surface plasmons, is shifted by the applied top layers The phase and group velocities of the surface plasmons decrease, in exactly the same way as with a photon which propagates in a medium of refractive index n. Lateral structures within one or more applied layers to be investigated on top of a metal film lead to regions differing in surface plasmon dispersion. For this reason it is possible, by directing polarized light at the sample under a fixed angle, to make out lateral structures on the applied layer or layers on account of their differences in reflectivity or brightness. If polarized light is directed at the sample under varying angles, the dispersion criterion can be satisfied for various regions within the applied layer or layers at different angles of incidence. These individual regions in turn change their brightness This is another way of rendering lateral structures visible.

To understand the optical excitation of surface plasmons, the component of the complex wave vector of the incident light is considered parallel to the surface of the metal or semiconductor film. If the angle of incidence of the incident polarized light satisfies meets the dispersion relation within the free charge carrier plasma or at the interface, surface plasmons are released, so that the irradiated metal or semiconductor surface then only appears slightly reflective. The wave vectors of surface plasmons parallel to the surface of the metal or semiconductor film, however, are within a range which cannot be reached even by extremely large angles of incidence.

For this reason, a coupling arrangement is employed between the light source used and the surface of the metal film. One possibility is a grid coupling where the surface of the metal film is modulated with a grid structure. Another possibility is the coupling-in of the incident polarized light with the aid of a prism above the limiting angle for total reflection. To this end, either a thin metal or semiconductor film can be applied directly to the prism, or a certain distance is maintained between the totally reflecting surface of the prism and the metal layer which is applied to a solid substrate (for example a glass microscope slide). The first type of prism coupling is referred to as a Kretschmann configuration and the second type as an Otto configuration. In the first case, the layers to be investigated are applied to the prism remote back of the metal layer; in the Otto configuration, the layers to be investigated are applied to the surface of the metal layer, so that these layers lie between the metal layer and the prism.

Apparatus for studying the physical properties of thin films or layers is simple to construct mechanically and optically. Preferably, plasmons are generated using a prism coupling system in the Kretschmann configuration by adhesively bonding to the prism surfaces, using an immersion fluid, a microscope slide which carries the metal layer on its back. Alternatively, the metal can also be applied directly to the prism surface The metals used are silver, gold, copper and aluminum, and also layer systems of these metals It has proven advantageous to use a layer system comprising 2–5 nm of chromium and 40 nm of gold. The resulting mirror is illuminated under a flat angle through one of the two free side surfaces of the prism using parallel monochromatic or colored light polarized parallel to the plane of incidence and imaged through the other free side surface of the prism onto a screen or an eyepiece with the aid of an achromatic lens of small focal length which is focused on the mirror The attainable magnitude is determined by the focal length of the lens.

For the purposes of investigation, the air-facing side of the mirror can be covered with thin dielectric layers by known dip, spray or contact coating techniques. Care must be taken here to ensure that the mirror is not damaged, and if necessary it is coated beforehand with an inert protective layer, for example a layer of silicon dioxide or silane, in a thickness which must be less than the thickness of the mirror. The dark plane of the lens or lens system and the applied layers are freely accessible in this apparatus, a particular advantage being that the applied layers can also be investigated in different media, for instance in highly contaminated liquid surroundings, since the rays from the light source need not pass through this medium. It is possible to study layers within the thickness range of less than $10^3$ nm. As regards contrast, information content and economy, the process and apparatus are superior to existing processes in particular within the range of ultrathin layers having thicknesses of less than 5–2 nm.

Surface plasmon microscopy has been described by B. Rothenhäusler and W. Knoll in Nature 332 (1988), 615, who used the technique to study cadmium arachidate layers applied to silver by the Langmuir-Blodgett technique. The Langmuir-Blodgett technique for preparing thin films or layers and multilamellar systems has been described for example by H. Kuhn, D. Möbius and H. Bücher in Physical Methods of Chemistry, edited by A. Weissberger and B. W. Rossitter (Wiley, N.Y. 1972), part III B, chapter VII.

Suitable polymers for preparing the thin polymer layer <0.1 μm in thickness for the process according to the present invention are preferably those organic addition and condensation polymers as can be applied or transferred to metallic layers by means of the Langmuir-Blodgett technique. Such suitable organic polymers have been described for example in EP-A-300 420. They can be for example polyglutamates having long-chain substituents in particular in the γ-position and polymers which contain long-chain n-alkyl side groups attached to the main chain of the polymer via polar groups, for example via

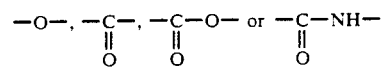

with which, dissolved in an organic solvent, e.g. n-heptane or $CHCl_3$, are spread out at the interface between water and air and, after the solvent has evaporated, are transferred in a conventional manner by the Langmuir-Blodgett technique to a metallic or semiconductor layer on a solid support.

Suitable polymers or polymerizable monomers which can be transferred to a metallic or semiconductor layer by the Langmuir-Blodgett technique and which are suitable for the process according to the present invention also include for example amphiphilic polyacetylene compounds, such as amphiphilic diacetylenemonocarboxylic acids and derivatives thereof Such monomeric and polymeric substances are described for example in J. Polym. Sci.: Polym. Chem. Ed. 17 (1979), 1631–44, EP-A-22618, EP-A-77 577, EP-A-21 695 and U.S. Pat. No. 4,314,021.

However, besides the Langmuir-Blodgett technique it is also possible to use other methods for preparing polymer layers <0.1 μm in thickness on metallic or semiconductor layers, for example spin coating of polymer solutions, adsorption from the liquid phase (the self assembly technique), casting and evaporation (PVD and CVD, i.e. physical or chemical deposition from the gas phase) of organic polymers Suitable for this purpose are for example homopolymers and copolymers, e.g. polyalkyl methacrylates, in particular polymethyl methacrylates, polystyrene, polycarbonate, cellulose acetate, cellulose butyrate and cellulose alkyl ethers. Suitable organic addition and condensation polymers for this purpose can have average molecular weights $\overline{M}_n$ of from 1,000 to 1,000,000, preferably from 20,000 to 200,000.

The polymer layer is in general <0.1 μm, in particular 3–4 nm, in thickness and rests on a metallic layer, for example a thin, 40–50 nm thick layer of silver, chromium, gold, copper, aluminum or an alloy thereof, or on a semiconductor layer, for example a silicon or germanium layer, this metallic or semiconductor layer preferably having been fixed in turn on a solid optically transparent support material, such as glass or a dimensionally stable plastics film, e.g. a film made of polyethylene terephthalate.

The introducing of information into the thin polymer layer by imagewise irradiation to create in the irradiated areas a permanent change in the properties can be effected by a suitable conventional method, for example by placing a mask on top of the thin polymer layer and irradiating with electromagnetic rays of the visible and ultraviolet region (from 200 nm to 700 nm), for example laser beams of from 200 to 700 nm, or particle rays, for example α-, neutron, electron, γ- or X-rays. Preference is given to electromagnetic rays. The masks used here are the customary ones, for example those made of metal. It is also very advantageous to introduce the information into the thin polymer layer by a lithographic technique, for example by direct irradiation with a focused electron beam, for example from 5 to 200 keV in energy, or with a focused laser beam, for example an argon ion laser.

In a preferred embodiment of the process according to the present invention, the thin polymer layer receiving information contains one or more dyes in a defined concentration per unit area. These dyes are preferably oleophilic dyes which are soluble in organic solvents.

Examples of suitable oleophilic dyes are:
dyes on a hydrocarbon basis and derivatives thereof, e.g. carotenes, such as β-carotene, carotenecarboxylic esters, such as ethyl β-apo-8'-carotenecarboxylate (trans), oleophilic dyes of the class of the Sudan dyes, preferably azo and disazo dyes, in particular those which are substituted by at least one alkyl (e.g. methyl or ethyl) in the ortho-position relative to the azo group, e.g. Oil Red (C.I. Solvent Red 27, C.I. No. 26 125) or Fat Red (C.I. Solvent Red 10, C.I. No. 26 050) and other dyes of this kind (C.I.=Colour Index of the Society of Dyes and Colourists).

If the Langmuir-Blodgett technique is used to apply the thin polymer layer with its oleophilic dye content it is advisable to use in particular those oleophilic dyes which by themselves do not form any ordered structures at the interface between water and air.

The oleophilic dye can be used in an amount ranging from small to an amount just falling short of destroying the liquid-analogous state of the organic polymer to be used according to the present invention.

The oleophilic dye can be regarded as dissolved in the side chains of the organic polymer suitable for forming a Langmuir-Blodgett layer.

The invention is further illustrated by the following Examples:

EXAMPLE 1

If, to prepare a thin polymer layer, a liquid-crystalline material, such as poly(γ-methyl L-glutamate-co-γ-n-octadecyl L-glutamate) (PM-co-OLG, $\overline{M}_n = 12,000$), is used, it is possible to prepare a unimolecular layer therefrom at the water/air interface by spreading it out in a solvent in which the polypeptide backbone adopts a helical conformation; cf. G. Duda, A. J. Schouten, T. Arndt, G. Lieser, G. F. Schmidt, C. Bubeck and G. Wegner, Thin Solid Films 159 (1988), 221. The transport to a hydrophobic surface can be achieved without loss of helicity from a fluid-analogous state in which the octadecyl side chains are largely disordered (fluid-like).

The disordered copolymer used contains for example 32 mol % of octadecyl-carrying repeat units. A solution of 0.1 mg of this polymer in 1 ml of CHCl₃ is spread out on a pure water subphase in a commercial Langmuir film balance (for example from Meβgerätewerk Lauda), compressed to 20-25 mN/m and transferred as a Y-layer to the hydrophobic solid substrate at a sample liftoff speed of 25 mm/min. The rodlike polymers become aligned to a certain extent on the water surface and then, during transfer, in a direction parallel to the dip direction, leading to a structural and an optical anisotropy. The refractive indices can be derived in all three space directions in separate experiments. The single double layer is 3.5–3.7 nm in thickness. The photoaddressable marking used was Fat Red (C.I. No 26 050), which has the following structural formula:

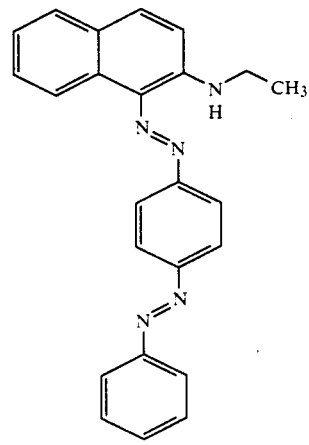

and can be dissolved in the oleophilic matrix of the alkyl side chains of polymers by spreading them out on the water surface together with the polypeptide (cf. G. Duda and G. Wegner, Macromol. Chem. Rapid Commun., 9 (1988), 495). It is possible in this way to produce homogenous mixtures which contain up to 15% of dye molecules per 100 polymer repeat units having a dichroic ratio OD/OD″=1.5, indicating preferential alignment of the dye molecules perpendicular to the α-helix main axis. In the present case, use was made of mixtures containing 7 mol % and 15 mol % respectively.

The arrangement for reading out information using surface plasmons or plasmon surface polaritons (PSPs) is shown schematically in FIG. 1, where 1 signifies a light source, 2 a polymer layer, 3 a metal layer, 4 a glass microscope slide, 5 an immersion fluid, 6 a glass prism, 7 a lens and 8 a camera (or screen) The laser beam 1 (Ar ion laser, λ=456 nm) is coupled in the usual Kretschmann configuration (cf. E. Kretschmann, Opt. Commun. 6 (1972), 185) to the PSP modes at the silver layer/polymer layer interface via a glass prism. The resonant excitation of PSPs in a laterally inhomogeneous interface always takes place when the momentum matching condition $K_{photon} = K_{surface\ plasmon}$ satisfied between the parallel components of the photon wave vector $K_{photon}$ and the PSP wave vector $K_{sp}$ (cf. B. Rothenhäusler and W. Knoll, Nature 332 (1988), 615). The latter depends sensitively on the thickness and the refractive index of the applied layer, which leads to the observed high contrast in the image of a heterogeneous layer. All the images were recorded with a charged coupled device (CCD) camera and stored on tape for later analysis or entered directly into an image analysis system.

Measurements of the reflectivity as a function of the angle were possible with the same apparatus on replacing the lens and the camera by a photodiode (cf. B. Rothenhäusler, J. P. Rabe, P. Korpiun and W. Knoll, Surf. Sci. 137 (1984), 373) for recording the reflected light intensity.

The introducing of information was effected by irradiating the dye-doped copolyglutamate double layers with the beam of the Ar ion laser through an electron microscope grid as mask. The power used was 1-2 watts at $\lambda=514$ nm near the absorption maximum of Fat Red at $\lambda=540$ nm (cf. also G. Duda and G. Wegner, Macromol. Chem., Rapid Commun. 9 (1988), 495) for several minutes, bleaching the dye, as was verified in a separate experiment. The identical treatment of an undoped layer or of the uncoated silver layer had no detectable effect in the present case on the read-out with PSPs.

Figure 2:
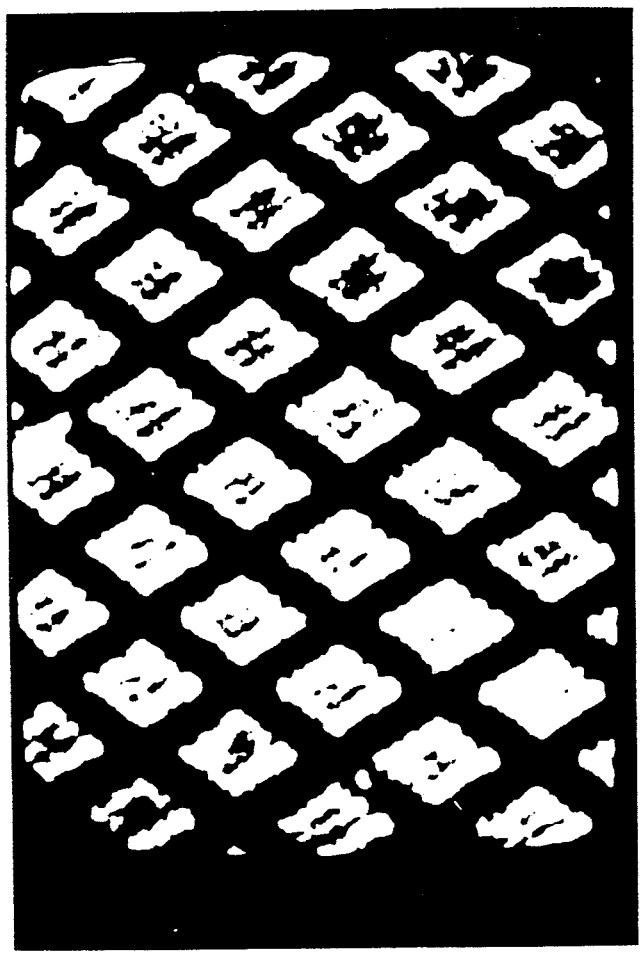

FIG. 2 shows the surface plasmon micrograph recorded with parallel-polarized (=polarized parallel to the plane of incidence) light of a copolyglutamate double layer doped with 7 mol % of Fat Red. Prior irradiation ($\lambda=514$ nm) through a crossgrid used as mask was carried out with a power output of 2 W for an irradiation time of 8 minutes. The angle of incidence $\Theta_0$ was 50.4° where the nonirradiated areas under the 20 $\mu$m wide strips of the copper grid mask are in resonance and therefore appear dark (cf. B. Rothenhäusler and W. Knoll, Nature 332 (1988)). The grid constant is 80 $\mu$m. The irradiated areas are optically changed, as a result of which their angle of resonance is shifted toward slightly lower values of $\Theta_1$. At $\Theta_0$, therefore, the bulk of the light is totally reflected, so that they appear bright. The inhomogeneity of the light emanating from these squares is an interference effect. The propagatable PSP modes resonantly excited in the dark areas extend into the irradiated areas, where they interfere coherently with the driving photon field (cf. B. Rothenhäusler and W. Knoll, J. Opt. Soc. Am. B5 (1988), 1401). Similar images were recorded with a copolyglutamate double layer doped with 15 mol % of Fat Red.

Purely bright images without contrast are obtained on using perpendicularly polarized light (light polarized perpendicularly to the plane of incidence) or exciting it non-resonantly.

To gain a more quantitative understanding of the physical basis of this contrast mechanism, which permits the storage of information in these ultrathin media and the reading out with a very high signal-to-noise ratio, the angle-dependent reflectivity was measured As expected, the PM-co-OLG double layer shifts the resonance of the PSP coupling toward higher angles in relation to the pure, uncoated Ag/air interface. Dye doping brings about a further shift in the resonance curves. The good agreement between the experimental data points and the theoretical curves calculated on the basis of Fresnel theory proves the validity of the layer architecture which has been assumed. Undoped PM-co-OLG was assumed to have an average (isotropic) refractive index of $n=1.48$, as was observed in the case of multilamellar samples. The only free adaption parameter is then the thickness d of the double layer. The value obtained, $d=3.5$ nm, is in agreement with small angle X-ray data which were in turn obtained on multilamellar samples. The structural features of the first two copolyglutamate layers on an Ag surface therefore appear to be very similar to the properties of solid (multilamellar) material. The sample containing 7 mol % of dye had been found by X-ray data to show an increase in the thickness compared with pure PM-co-OLG of $d=0.25$ nm (cf. G. Duda, doctoral thesis, University of Mainz, 1988). Using the same value for the present double layer gives an effective refractive index of $n=1.56$. Assuming a linear increase in the layer thickness with an increasing dye content (cf. G. Duda and G. Wegner, Macromol. Chem., Rapid Commun 9 (1988), 495) will produce an effective refractive index of $n=1.73$ for the sample having a Fat Red content of 15 mol %.

The absorption by the dye is negligible, which is also confirmed by experiments with the beam of an HeNe laser $\lambda=633$ nm, i.e. far away from the absorption band of the dye.

Measurements of the reflectivity recorded directly on the grid structures of FIG. 2 give further insights into the contrast mechanism. The result obtained with a sample containing 15 mol % of Fat Red was compared with that obtained with an undoped layer or a doped but non-irradiated layer. Irradiation shifts the resonance to the value for the undoped layer. However, this does not mean that the dye disappears on irradiation to leave, finally, a pure polyglutamate matrix. Instead, structural changes are presumably induced in the polymer packing, most probably a helix to coil transition in the irradiated areas, which leads to a reduction in the effective optical thickness which is responsible for the PSP resonance shift. This is a qualitative explanation of the observed sensitivity of the read-out technique. Small changes in the irradiated areas lead to a small shift in the sharp resonance curves—enough to produce a sufficient difference in the reflected intensity between irradiated and non-irradiated areas. A comparison of these results with studies on the thermostability of multilayered copolyglutamate shows that the layers are thermally stable up to 150° C.; at higher temperatures, a phase change into the $\beta$-folded layer structure is observed on cooling down.

These systems can likewise undergo a contrast inversion (cf. B. Rothenhäusler and W. Knoll, Nature 332 (1988), 615) by twisting the sample by a few tenths of a degree, thereby bringing the irradiated areas into resonance.

The stored information is preserved over several weeks. The sample containing 15 mol % of dye was stored for 4 weeks and then investigated by surface plasmon microscopy. Stored information was still readable.

The process according to the present invention therefore makes it possible to store optical information permanently in a polymer matrix in the form of a flat film only 3.7 nm in thickness transferred to a solid using for example the Langmuir-Blodgett dipping technique. Wavelength-selective writing is conceivable through the use of dyes having different absorption bands which have been deposited for example in different layers of a multilamellar assembly.

The reading out of the stored information is effected according to the present invention using surface plasmon modes by means of recently developed surface plasmon microscopy. The high contrast which it has been possible to achieve is based on the sensitive dependence of the resonance coupling between photons and plasmon surface polaritons upon small changes in the optical properties (real and imaginary part of the dielectric function) of the storage medium.

EXAMPLE 2

A glass microscope slide coated with 3 nm of chromium + 40 nm of gold was spin-coated with a solution of 1 g of polymethyl methacrylate and 0.05 g of Fat Red (C.I. No. 26 050) in 10 g of xylene (speed: 2,500 r.p.m.). After the solvent had been removed, the thickness of the polymethyl methacrylate layer was found to be 30 nm. This thin polymer layer, which contained the dye in a uniform solution, was irradiated as in Example 1 through a grid mask ($\lambda=514.5$ nm; power output: 1 W; irradiation time: 5 minutes). As in Example 1, the information stored in the polymer film can be read out using surface plasmons.

EXAMPLE 3

A solution of pentacosa-10,12-diynoic acid in n-hexane (without the addition of a dye) was spread on top of a pure water subphase in a Langmuir film balance and applied by the method of Example 1 as a Y-layer to a Cr/Au-coated glass slide using the Langmuir-Blodgett technique. Irradiation through a copper mask with UV light ($\lambda 294$ nm) resulted in polymerization in the irradiated areas. The information thus stored was readable using surface plasmons following removal of the mask and storage for several days.

We claim:

1. A process for storing information in a thin polymer layer and later reading out the stored information, which process comprises: 1) providing a polymer layer having a thickness of less that 0.1 $\mu$m on a metallic or semiconductor layer; 2) treating the polymer layer by imagewise exposure or a lithographic process involving electromagnetic or particle rays so as to produce a permanent change in the properties of the polymer layer and thereby store information in the form of surface plasmons on the polymer layer; and 3) reading out the stored information by subjecting the thin polymer layer containing the stored information in the form of surface plasmons to a laser beam.

2. A process as claimed in claim 1, wherein the polymer layer <0.1 $\mu$m in thickness has been applied to a metallic or semiconductor layer by the Langmuir-Blodgett technique, by spin coating, by vapor deposition or by adsorption from the liquid phase.

3. A process according to claim 1, wherein the polymer layer contains at least one dye in a defined concentration per unit area.

4. A process as claimed in claim 3, wherein the dye used is at least one oleophilic dye which is soluble in organic solvents.

5. A process as claimed in claim 1, claims, wherein the polymer used for the polymer layer is an organic addition or condensation polymer.

6. A process as claimed in claim 5, wherein the organic polymer used is a homopolymer or copolymer of an alkyl acrylate or methacrylate.

7. A process as claimed in claim 5, wherein the organic polycondensate used is a polyglutamate substituted in the $\gamma$-position by long-chain substituents or a copolyglutamate which has different alkyl substituents in the $\gamma$-position.

8. A process as claimed in claim 7 wherein the organic polycondensate used is poly($\gamma$-methyl L-glutamate-co-$\gamma$-n-octadecyl L-glutamate).

9. A process as claimed in claim 1, wherein imagewise exposure is effected by means of electromagnetic or particle rays using a mask placed on the polymer layer.

10. A process as claimed in claim 1, wherein the lithographic process is carried out by direct irradiation with a focused electron or laser beam.

11. A process as claimed in claim 1, wherein the permanent change in the properties of the polymer layer created in the irradiated areas by imagewise exposure or lithographically using electromagnetic or particle rays takes the form of a structural phase transition of the polymer.

12. A process as claimed in claim 3, wherein the permanent change in the properties of the polymer layer created in the irradiated areas by imagewise exposure or lithographically using electromagnetic or particle rays is obtained by bleaching or conversion of the dye or dyes present therein.

* * * * *

UNITED STATES PATENT AND TRADEMARK OFFICE
CERTIFICATE OF CORRECTION

PATENT NO. : 5,049,462

DATED : SEPT. 17, 1991

INVENTOR(S) : FUNHOFF et al.

It is certified that error appears in the above-identified patent and that said Letters Patent is hereby corrected as shown below:

column 10, line 7: delete "claims"

Signed and Sealed this

Sixteenth Day of November, 1993

Attest:

BRUCE LEHMAN

*Attesting Officer*      *Commissioner of Patents and Trademarks*